July 2, 1940.　　　　E. C. S. CLENCH　　　　2,206,163
LIQUID PRESSURE REMOTE CONTROL APPARATUS
Filed June 9, 1937　　　　3 Sheets-Sheet 1
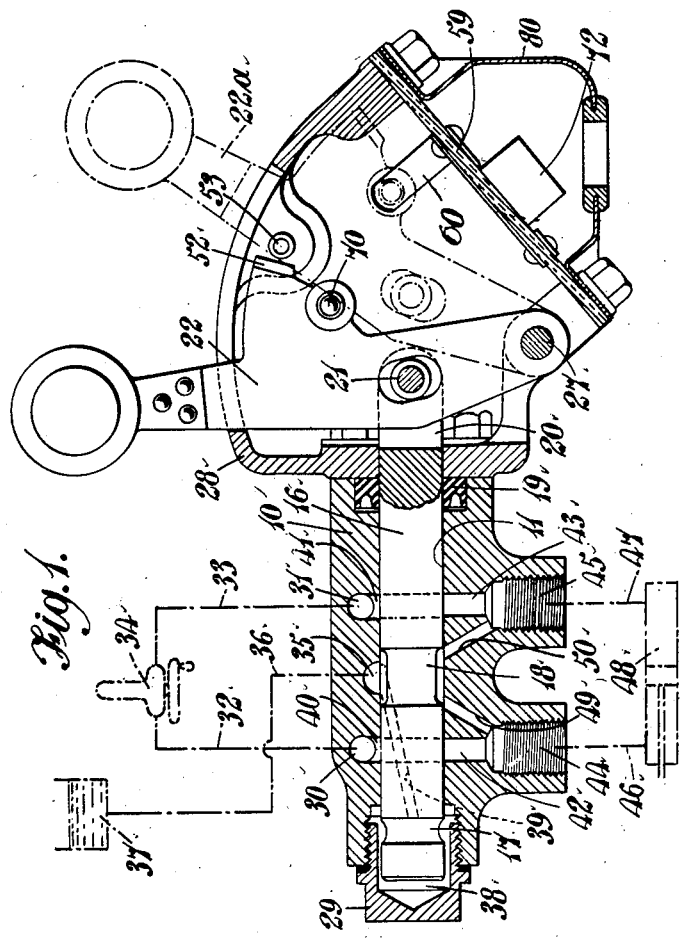
INVENTOR
E. C. S. Clench.
By Lacey & Lacey,
Attys

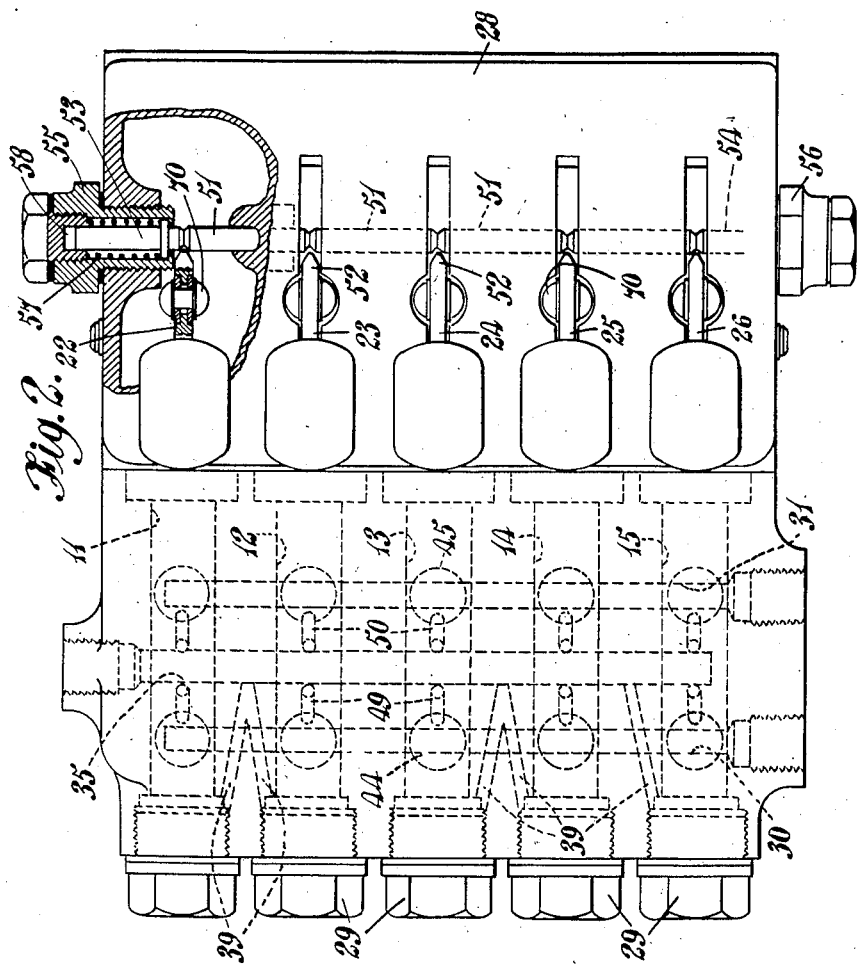

July 2, 1940. E. C. S. CLENCH 2,206,163
LIQUID PRESSURE REMOTE CONTROL APPARATUS
Filed June 9, 1937 3 Sheets-Sheet 3
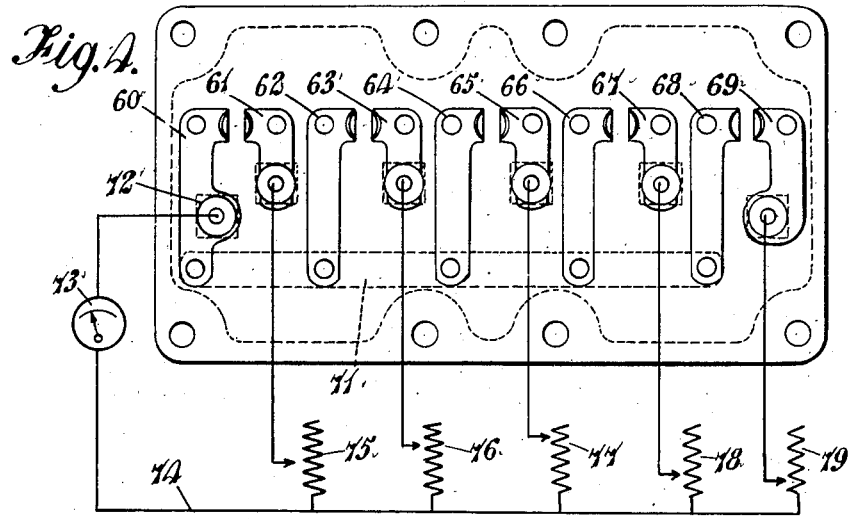
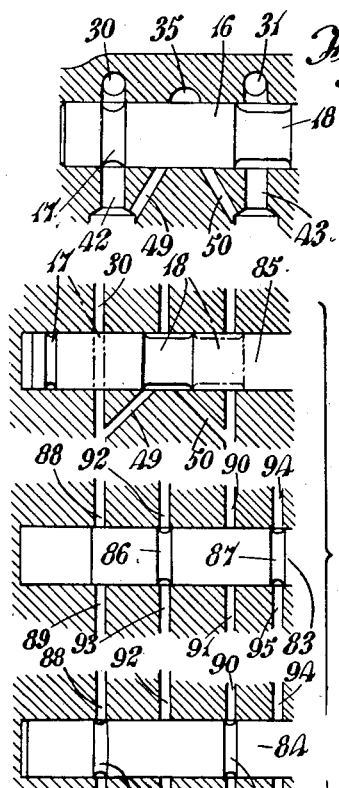
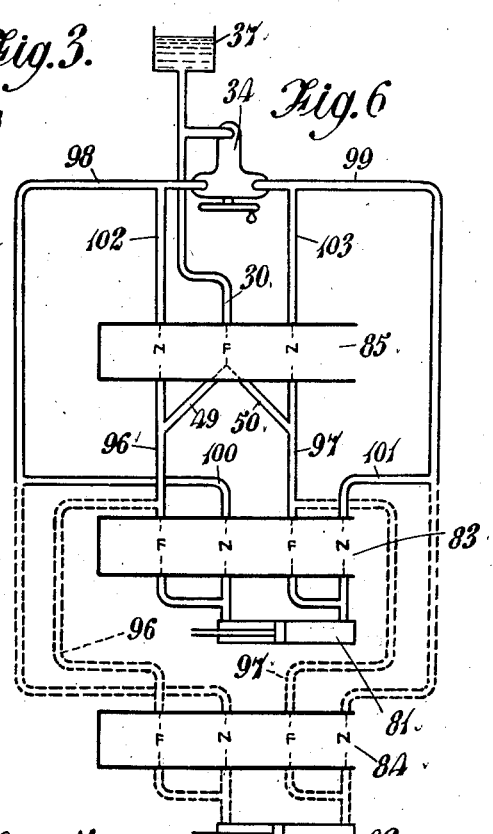
INVENTOR
E. C. S. Clench.
By Lacey & Lacey,
Attys Patented July 2, 1940

2,206,163

UNITED STATES PATENT OFFICE 2,206,163

LIQUID PRESSURE REMOTE CONTROL APPARATUS

Edward Claude Shakespeare Clench, London, England, assignor to Automotive Products Company Limited, London, England Application June 9, 1937, Serial No. 147,365 In Great Britain June 9, 1936

12 Claims. (Cl. 60—52)

This invention relates to liquid pressure remote control apparatus, and it has for its object to provide an improved method and means whereby a liquid pressure system employing a plurality of motor cylinders or equivalent units which require individual operation may be simplified, and also rendered light in weight so as to enable it to be satisfactorily used in connection with aircraft controls. The invention is particularly useful in connection with the rotary transmitter pump described in my Patent No. 2,155,529 granted on co-pending application Serial No. 124,153 filed February 4, 1937, although, of course, it will be understood that it is equally applicable for use with other forms of apparatus whenever one master cylinder or equivalent is required to actuate selectively any one or more of a plurality of motor cylinder units. In this connection it will be noted that the transmitter pump described in the above-mentioned application feeds either one of two pipe lines according to the direction in which the handle is turned, and when the operator lets go the handle both of said pipe lines are automatically placed in connection with a reservoir.

It is a further object of the present invention to provide an improved liquid pressure remote control system in which all the parts which happen to be inoperative at any particular time are automatically permitted to breathe, i. e. are placed in communication with a reservoir or other body of liquid at substantially atmospheric pressure, in order that variations due to expansion and contraction of the components and the liquid contained therein can be automatically compensated for without bringing about an unwanted change in the settings of the motor units.

According to one feature of the invention, in a double-acting two pipe line remote control system, there is provided a selector valve arranged to connect the output from a common pressure-creating device with any one of a plurality of double-acting motor units, and to connect the other or others of said motor units with a reservoir to permit breathing and compensate for temperature changes. Thus, in a double acting two pipe line remote control system comprising a reversible flow pump and a plurality of double-acting motor units each having two pipe lines, either of which receives pressure liquid according to the direction in which said motor unit is to be actuated, the invention provides a selector valve arranged to connect the pipe lines of the pump with those of any one of the motor units, and at the same time to maintain the pipe lines of the remaining motor unit or units in communication with a reservoir to permit breathing.

The invention further provides a double-acting remote control system comprising in combination a reversible flow master pump having two pipe lines, one for pressure liquid and the other for the returned liquid, a plurality of double-acting motor units each having two pipe lines, a reservoir feeding the system, and a selector valve receiving the pressure liquid from the master pump and passing it to a selected motor unit, the liquid returned from said unit being returned by the selector valve to the pump, while said valve also places automatically into communication with the reservoir the pipe lines of those motor units not connected with the master pump. Preferably the master pump is arranged to embody the concept disclosed and claimed in my U. S. Patent No. 2,126,310 granted August 9, 1938, so that when the pump is inoperative its two pipe lines for the pressure and return liquid are automatically placed in communication with a reservoir, thus permitting the breathing of the pipe lines of a motor unit connected with the pump by the selector valve during such time as the pump is inoperative.

The invention is illustrated in the accompanying drawings in which

Figure 1 is a sectional side elevation through a selector valve arranged for the actuation of any one of five motor units;

Figure 2 is a plan corresponding to Figure 1 partly broken away to show the inter-locking mechanism;

Figure 3 is a diagram showing one of the piston valves in its "on" position;

Figure 4 is an interior view of the electric contact plate;

Figure 5 is a sectional diagram showing the piston valves of a modified form of selector valve arranged with a master piston valve adapted to allow the simultaneous actuation of all the motor units; and Figure 6 is a diagram of the connections corresponding to Figure 5.

The selector valve, the constructional features of which are shown principally in Figures 1 and 2, comprises a substantially flat valve body 10 which is formed with five mutually parallel bores indicated at 11, 12, 13, 14 and 15 each containing a piston valve plunger, one of which is shown at 16 in Figure 1. As in the example shown in Figures 1 to 4, these plungers are all identical, one only need be described. Thus, the plunger 16 comprises a rod which is formed adjacent its free end with a relatively narrow peripheral groove or waisted portion 17, and approximately at the centre part of its length with a longer waisted portion 18. A packing ring 19 which is accommodated within a recess in the body 10 serves to prevent leakage of liquid, while the outer end of the plunger 16 is slotted diametrally as indicated at 20 and is fitted with a transverse pin 21 engaging slidably in a slot formed in the corresponding operating lever 22. The whole five of these levers, which are shown at 22–26 in Figure 2, are pivoted at their lower ends 27 and are accommodated within a housing 28, the top of which is curved and is suitably slotted in order to allow the prescribed arcuate movement of the levers 22–26.

Each of the bores 11–15 in the body 10 is closed by a cap 29, and the body is drilled from one side at 30 and 31 to form alternative inlet and return passages to be connected with the pipe lines 32 and 33 from a reversible flow master pump or transmitter unit 34. A similar but larger passage 35 is drilled laterally from the opposite side of the body 10, and is connected as by a pipe line 36 with a reservoir 37 which may be used for replenishing the master pump 34 as shown. The transmitter unit 34 may be of the form described in the aforesaid Patent No. 2,155,529 in which case an extra connection (not shown) between the casing of the pump and the reservoir 37 would be required. The passage 35 is in permanent communication with the space 38 within the caps 29 by way of oblique passages 39 in order that the plungers 16 may be moved freely. It will be seen from Figures 1 and 2 that the passage 35 cuts into the various bores 11–15, but the passages 30 and 31 are connected therewith by short branch passages 40 and 41 which are in fact constituted by pairs of passages, continuations of pairs of passages 42–43, extending upwardly from the bottom of the body 10, one pair for each of the bores 11–15. The passages 42 and 43 are enlarged, as indicated at 44 and 45, for the reception of unions (not shown) to be connected by pipe lines 46 and 47 with the respective ends of a motor cylinder unit indicated at 48, which unit is thus controlled by the corresponding valve plunger 16. A pair of oblique passages 49 and 50 extend from each pair of cavities 44 and 45, and break into each of the bores 11–15 for the purpose of permitting breathing to take place, as will now be explained.

When any particular valve plunger 16 is in its "off" position, i. e. when the lever 22 is moved towards the left as seen in Figure 1, communication between the passage 30 and the passage 42 is interrupted by the plunger 16, and similarly the working liquid in the passage 31 is cut off from the passage 43. It will be seen, however, in Figure 1 that the waisted portion 18 bridges the two oblique passages 49 and 50, and also connects these with the passage 35 leading to the reservoir 37. Thus, when the valve plunger 16 is "off" breathing of the motor cylinder and its pipe lines 46 and 47 is freely permitted, despite the fact that other motor cylinder units connected with the selector valve as a whole may be in course of operation. When the setting of the particular motor cylinder unit 48, shown in Figure 1, is to be changed the lever 22 is moved to the position indicated at 22a, thus shifting the plunger 16 to the right until it occupies the position shown in Figure 3. The waisted portion 17 then connects the passage 30 with the passage 42, while the waisted portion 18 similarly joins passages 31 and 43, thus enabling the piston of the motor cylinder unit 48 to be moved positively in either direction by actuating the pump 34 so as to produce a flow of liquid in the requisite direction along the pipes 32 and 33. It will be noted that when the plunger 16 is in its "on" position the cylindrical part between the portions 17 and 18 effectually isolates the passages 49 and 50 from one another and from the passage 35 from the reservoir 37. As previously mentioned, the construction of the plungers 16 in all the bores 11–15 are the same in the selector valve shown in Figures 1 and 2, so that the action is identical for whichever lever 22–26 is moved to its "on" position. The selector valve shown is arranged so as to be suitable for use with an indicator device which is common to all of the motor cylinder units, and it is important therefore than an inter-locking device should be provided for preventing more than one of the levers at a time from being placed in their "on" positions. This comprises a series of stop members 51 which are arranged contiguously in a row, each stop member being disposed between two adjacent levers 22–26. The two ends of each stop member 51 are chamfered as shown and the ends are normally disposed in line with a knife edge 52 formed upon the corresponding lever 22–26. For supporting the members 51 in this position end stops 53 and 54 are slidably mounted in corresponding caps 55 and 56, a compression spring 57 in each case being used for maintaining the stop members 51, 53 and 54 in contact with one another. It will be noted that an end clearance space 58 having an axial length substantially equal to one half the thickness of one of the operating levers 22–26 is provided within each of the caps 55 and 56, so that when any one of the levers 22–26 is moved to its "on" position the row of stop members 51, 53 and 54 is separated at this point and the two clearance spaces 58 are taken up, thus preventing another of the levers from being moved to its "on" position until the first-mentioned lever is returned to its "off" position. The abutting ends of the stop members are formed as shown in Figure 2 in order to allow the row to be easily intersected by one of the knife edges 52, but when one of the levers 22–26 has been moved to its "on" position all the stop members are moved axially so that the unchamfered parts of the stop members are then disposed opposite to the knife edges 52.

For the purpose of automatically actuating an electrical remote indicating system, such for example as the form described in the aforesaid Patent No. 2,155,529, the casing 28 is closed by a plate 59 composed of electrical insulating material, and provided upon its interior surface with a series of switch contacts 60–69 which are arranged in pairs for cooperation with corresponding insulated circuit-closing studs 70 provided one upon each of the levers 22–26. The contacts 60, 62, 64, 66 and 68 are connected to a shunt conductor 71 having a terminal 72 for connection with a suitable indicating instrument 73, the latter in turn being connected by a wire 74 with one side of each of a number of variable resistance elements 75–79 which are actuated by the motor units controlled by the respective levers 22–26 as described in the aforesaid Patent No. 2,155,529. The other side of each of the resistances is connected with the corresponding terminals 61, 63, 65, 67 and 69 as shown in Figure 4. Thus, whenever one of the levers 22–26 is moved to its "on" position the master pump 34 is automatically connected with the corresponding motor unit, and also the appropriate resistance 75–79 is connected with the indicator 73 so as to show the prevailing setting of the said motor unit at a position adjacent the master pump 34. A cover 80 conveniently protects the terminals which are disposed upon the outside of the plate 59.

In the modification illustrated in Figures 5 and 6 the general construction of the selector valve is the same as that previously described but the valve plungers and the ports in the body are modified in such a way as to enable a master operating member to control the simultaneous actuation of all the motor units irrespective of the prevailing settings of the normal valve plungers. This arrangement is advantageous where, for example, each of the motor units controls a fuel valve of an aircraft, it being desirable under some circumstances to actuate all the fuel valves simultaneously. In order to simplify the diagrams, the means are shown for controlling only two double-acting motor cylinder units 81 and 82 by slidable valve plungers 83 and 84 respectively. A third valve plunger 85 is, however, provided, and when this is moved to its "on" position actuation of the master pump 34 in either direction causes a corresponding change in the setting of both motor cylinder units 81 and 82. The constructional details of the two sorts of valve plungers and their bores in the valve body are shown in Figure 5, while Figure 6 indicates by solid and broken lines the connections between the various parts. Where each valve plunger establishes a connection across its barrel when the valve is in its "off" position, this is marked with the letter "F," while the letter "N" denotes that a similar passage is made when the valve is moved to its "on" position.

Referring to Figure 5 the valve plunger 85 is identical in construction to each of those shown in Figures 1 and 2, while the plungers 83 and 84 which are similar in design both have a pair of waisted portions 86 and 87 for connecting together diametrally opposite ports in the bores accommodating said plungers. Thus in the "off" position as exemplified by the plunger 84 the waisted portion 86 connects together the passages 88 and 89, while the portion 87 correspondingly joins the passages 90 and 91. When the plunger, however, is moved to its "on" position as shown by the plunger 83 a passage 92 is joined to a passage 93, while the portion 87 similarly connects passages 94 and 95.

By comparing Figures 5 and 6, it will be seen that when all the valve plungers are in their "off" positions both pipe lines of each motor unit 81 and 82 are connected with the reservoir by passages 96 and 97 which lead to oblique passages 49 and 50. These in turn communicate with the waisted portion 18, and are connected with the pipe 30 leading to the reservoir 37. Should the valve plunger 83 for example be moved to its "on" position as shown in Figure 5, this will place the two sides of the motor unit 81 in communication with pipes 98 and 99 leading from the reversible flow pump 34, this connection being made by way of pipes 100 and 101. This does not, however, affect the breathing of the motor unit 82 which is still connected by pipes 96 and 97 with the reservoir 37. Similarly if the valve plunger 83 is returned to its "off" position, thus enabling the plunger 84 to be moved into its "on" position, the motor unit 82 will be connected with the pump 34, while the motor unit 81 is free to breathe through the pipes 96 and 97. It is understood that an inter-locking device would normally be provided for preventing at any particular time more than one of the valve plungers (excluding the master plunger) from being moved into their "on" positions. Assuming both of the plungers 83 and 84 are "off", movement of the plunger 85 to the right to the position indicated by the broken lines isolates the breathing passages 49 and 50 from the reservoir 37, and places the passages 96 and 97 in connection with the pipes 98 and 99 by way of passages 102 and 103 respectively. Thus, when the pump 34 is actuated pressure liquid is fed through the pipe 96 or 97 according to the direction in which the motor units 81 and 82 are to be actuated, this pressure feed taking place through the passages 96 and 97 which normally serve for breathing when the respective motor units are disconnected from the pump 34. If either one of the plungers 83 or 84 happened to be "on", pressure liquid would be fed as usual to the corresponding motor unit through pipes 98 and 99. In Figure 6, the connections used for the second motor unit 82 are shown in broken lines, and from this it will be apparent that any number of motor units may be similarly connected with their corresponding valve plungers for permitting individual control, while the action of moving the master plunger 85 to its "on" position will automatically place all of the motor units which are "off" into connection with the pipes 102 and 103 from the pump 34.

It will be understood that the invention may be carried into effect in several ways other than those described above, and that various modifications may be made in the construction and arrangement of the improved selector valve. Thus, for example, the latter may be made in units which are adapted to fit together according to the number of plunger valve elements required in each individual system. Moreover, instead of using valves of this type, any other suitable kind may be employed such as plug cocks or disc valves, these, of course, being arranged so as to permit the double-acting motor units to breathe when they are disposed in their "off" positions.

What I claim is:

1. In a double-acting two pipe line remote control system a selector valve arranged to connect the output from a common pressure creating device with any one of a plurality of double-acting motor units, and to connect the other or others of said motor units with a reservoir to permit breathing and compensate for temperature changes.

2. In a double-acting two pipe line remote control system comprising a reversible flow pump and a plurality of double-acting motor units each having two pipe lines either of which receives pressure liquid according to the direction in which said motor unit is to be actuated, the provision of a selector valve arranged to connect the pipe lines of the pump with those of any one of the motor units and at the same time to maintain the pipe lines of the remaining motor unit or units in communication with a reservoir to permit breathing.

3. A double-acting remote control system comprising in combination a reversible flow master pump having two pipe lines, one for pressure liquid and the other for the returned liquid, a plurality of double-acting motor units each having two pipe lines, a reservoir feeding the system, and a selector valve receiving the pressure liquid from the master pump and passing it to a selected motor unit, the liquid returned from said unit being returned by the selector valve to the pump, while said valve also places automatically into communication with the reservoir the pipe lines of those motor units not connected with the master pump.

4. A double-acting remote control system as claimed in claim 2 wherein the selector valve is provided with a plurality of operating members, one for each motor unit, and means are incorporated whereby only one of said members at a time can be moved to its "on" position.

5. A double-acting remote control system as claimed in claim 2 wherein the selector valve is provided with a plurality of operating members each controlling an individual motor unit which latter is automatically placed in communication with a reservoir for breathing when the member is in its "off" position, and is also provided with a master operating member which when moved to its "on" position causes liquid under pressure to be delivered to the whole of the motor units through the passages normally used for permitting breathing.

6. For a double-acting remote control system according to claim 2, a selector valve comprising a series of valve plungers each having its own operating member, means shiftable by operation of any one of said plunger operating members into a position of interference with respect to each of the other plunger operating members, whereby no other plunger operating member can move sufficiently to actuate its associated valve plunger, and means for returning said shiftable means to a non-interfering position upon return of the operated plunger operating member to its original position.

7. A control system as specified in claim 2, in which said selector valve comprises a series of piston valve members, slidable in a block and separately actuated by pivoted levers, and interlocking means whereby only one piston valve at a time can be moved to its "on" position.

8. A control system as specified in claim 2, in which said selector valve comprises a series of piston valve members slidable in a block and separately actuated by pivoted levers and interlocking means whereby only one piston valve at a time can be moved to its "on" position, wherein the interlocking means comprises an abutment which moves, in response to swinging of one of said levers, into a position such that no other lever can swing operatively until the first lever has swung back to the original setting.

9. A control system as specified in claim 2, in which said selector valve comprises a piston valve formed with two circumferential waist portions, one of which when the valve is off serves to connect a pair of breathing passages to a reservoir, while the action of moving the piston to its "on" position isolates the two breathing passages from one another and from the reservoir but connects by means of the two waisted portions, a pair of passages from the master pump with the two pipe lines respectively of a motor unit controlled by the said piston valve.

10. A double-acting remote control system as claimed in claim 2 having as an auxiliary a remote indicating system for showing on an indicator disposed adjacent the master pump the setting of a motor unit, wherein the selector valve is provided with means for simultaneously connecting the indicator with that part of the indicating system associated with the motor unit to which the master pump is connected.

11. A double-acting remote control system as claimed in claim 2, having as an auxiliary a remote indicating system for showing on an indicator disposed adjacent the master pump the setting of a motor unit, wherein the selector valve is provided with means for simultaneously connecting the indicator with that part of the indicating system associated with the motor unit to which the master pump is connected, the auxiliary indicating device operating electrically through conductors and a switch being associated with the selector valve for connecting the indicator simultaneously with the conductors appropriate to the liquid connection selected by the valve.

12. A selector unit for a double acting remote control system comprising a series of individual valve plungers each having its own operating member, and each cooperating with fluid flow connections to bring about the actuation of a particular one of a series of motor units, whereby each motor unit of the series is normally controlled by a particular one of said individual valve plungers, and a master operating member having a master valve plunger shiftable to a position in which it completes a path for flow of fluid simultaneously to all those motor units whose corresponding individual valve plungers are concurrently set so as to block fluid flow therethrough; there being simultaneous fluid flow to the remaining motor units by way of the remaining individual valve plungers, that is, by way of those individual valve plungers whose prevailing settings are such as to bring about such fluid flow therethrough, independently of said master valve plunger.

EDWARD CLAUDE SHAKESPEARE CLENCH.